United States Patent
Stainvas Olshansky et al.

(10) Patent No.: US 9,367,759 B2
(45) Date of Patent: Jun. 14, 2016

(54) COOPERATIVE VISION-RANGE SENSORS SHADE REMOVAL AND ILLUMINATION FIELD CORRECTION

(71) Applicant: GM GLOBAL TECHNOLOGY OPERATIONS LLC, Detroit, MI (US)

(72) Inventors: Inna Stainvas Olshansky, Modiin (IL); Igal Bilik, Rehovot (IL); Dan Levi, Kyriat Ono (IL)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 220 days.

(21) Appl. No.: 14/156,702

(22) Filed: Jan. 16, 2014

(65) Prior Publication Data

US 2015/0199579 A1   Jul. 16, 2015

(51) Int. Cl.
| | | |
|---|---|---|
| G06K 9/00 | (2006.01) | |
| G06K 9/34 | (2006.01) | |
| G06K 9/46 | (2006.01) | |
| G06T 5/00 | (2006.01) | |
| G06T 5/40 | (2006.01) | |

(52) U.S. Cl.
CPC .......... *G06K 9/4661* (2013.01); *G06K 9/00791* (2013.01); *G06K 9/4642* (2013.01); *G06T 5/008* (2013.01); *G06T 5/40* (2013.01); *G06T 2207/30252* (2013.01)

(58) Field of Classification Search
None
See application file for complete search history.

(56) References Cited

U.S. PATENT DOCUMENTS

| | | | | |
|---|---|---|---|---|
| 2010/0254595 | A1* | 10/2010 | Miyamoto | G06K 9/2036 382/159 |
| 2011/0150320 | A1* | 6/2011 | Ramalingam | G01C 21/3602 382/154 |
| 2012/0213440 | A1* | 8/2012 | Tappen | G06K 9/6296 382/173 |

OTHER PUBLICATIONS

Chen, Chun-Ting, Chung-Yen Su, and Wen-Chung Kao. "An enhanced segmentation on vision-based shadow removal for vehicle detection." Green Circuits and Systems (ICGCS), 2010 International Conference on. IEEE, 2010.*

Wang, Jung-Ming, et al. "Shadow detection and removal for traffic images." Networking, Sensing and Control, 2004 IEEE International Conference on. vol. 1. IEEE, 2004.*

Cavallaro, Andrea, Elena Salvador, and Touradj Ebrahimi. "Shadow-aware object-based video processing." Vision, Image and Signal Processing, IEE Proceedings-. vol. 152. No. 4. IET, 2005.*

\* cited by examiner

*Primary Examiner* — Stephen R Koziol
*Assistant Examiner* — Sean Conner (57) ABSTRACT

A method of creating a shadow-reduced image from a captured image. An image of a scene exterior of a vehicle is captured by a vehicle-based image capture device. A first object profile of an object in the captured image is identified by a processor. A second object profile of the object is detected using a non-vision object detection device. Shadows in the captured image are removed by the processor as a function of the first object profile and the second object profile. A shadow reduced image is utilized in a vehicle-based application.

5 Claims, 7 Drawing Sheets

COOPERATIVE VISION-RANGE SENSORS SHADE REMOVAL AND ILLUMINATION FIELD CORRECTION

BACKGROUND OF INVENTION

An embodiment relates generally to vision based object detection systems.

Illumination conditions such as shadows can cause errors in the vision based object detection systems. Shadows distort the color of a captured object resulting in ambiguities between (1) edges due to shadows and (2) edges between different entities (e.g., road and landscape). As a result, shadows distort colors of objects and background in the scene leading to appearance of ghost objects and making separation between obstacles and road difficult. Applications have been used to filter out shadows but prior art systems assume the use of a camera having a high quality imager. Cameras with high quality images are expensive with large packaging sizes, and therefore, not practical especially in a mass-produced vehicle based vision system. With the use of high quality imager, the camera sensor is assumed to be narrow-banded and behave like Dirac delta functions in that they have a non-null response only at a single wavelength. However, a low cost imager typically used in vehicle vision based object detection systems does not conform to the narrow-band sensor assumption. Therefore, previous techniques for shadow removal are inapplicable with the use low cost production imagers.

SUMMARY OF INVENTION

An advantage of an embodiment is the reduction of shadows from an image captured by a capture image device for identifying the object as well as a clear path of travel. The shadow-reduction technique utilizes a vision based imaging device and a range sensing device. The range sensing device identifies physical reflection points of the object, which can be used to differentiate the object from the shadow. Moreover, either a known light source or unknown light source can be determined which can be used in cooperation with a relative position with respect to the object to differentiate the object from the shadow.

An embodiment contemplates a method of creating a shadow-reduced image from a captured image. An image of a scene exterior of a vehicle is captured by a vehicle-based image capture device. A first object profile of an object in the captured image is identified by a processor. A second object profile of the object is detected using a non-vision object detection device. Shadows in the captured image are removed by the processor as a function of the first object profile and the second object profile. A shadow reduced image is utilized in a vehicle-based application.

DETAILED DESCRIPTION

Figure 1:
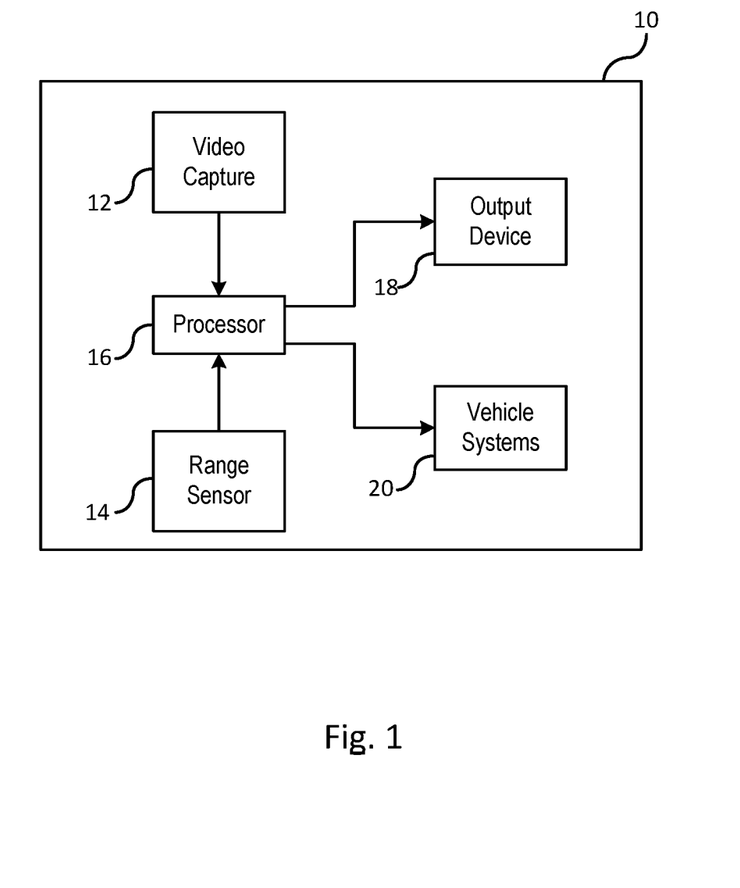
FIG. 1 is a block diagram of the shadow reduction system for reducing shadows in a captured image.

FIG. 1 illustrates a block diagram of the shadow reduction system for reducing shadows in a captured image. A vehicle is shown generally at block 10. A vision-based imaging system 12 captures images of the road. The vision-based imaging system 12 captures images surrounding the vehicle based on the location of one or more vision-based capture devices. The vision-based imaging system 12 may capture images forward of the vehicle when the vehicle is driven in a forward direction or may capture images to the rear or to the sides when the vehicle is backing up.

The vehicle may further include object detection sensors 14 for detecting images surrounding the vehicle 10. The object detection sensors 14, may include, but are not limited to range sensors such as lidar sensors, ultrasonic sensors, and proximity sensors. In addition, a camera stereo system that produces 3D stereo reconstruction can be used as well. The object detection sensors 14 are utilized in cooperation with the vision-based imaging system 12 for identifying shadows in a captured image and reducing the shadow within the captured image.

A processor 16 is coupled to the vision-based imaging system 12 and the object detection sensors 14. Alternatively, the processor 16 may be a shared processor of another device including, but not limited to, the vision-based imaging system 12. The processor identifies the shaded areas cast by the vehicle and reduces the shadows from the image. The shadow reduced images are then provided to output devices 18 or other vehicle applications 20. Output devices include, but are not limited to, display devices for enhancing a driver's view of a scene exterior of the vehicle. Other vehicle applications 20 may include, but are not limited to, collision avoidance applications, clear path detection applications, object detection applications, and vehicle motion applications.

Figure 2:
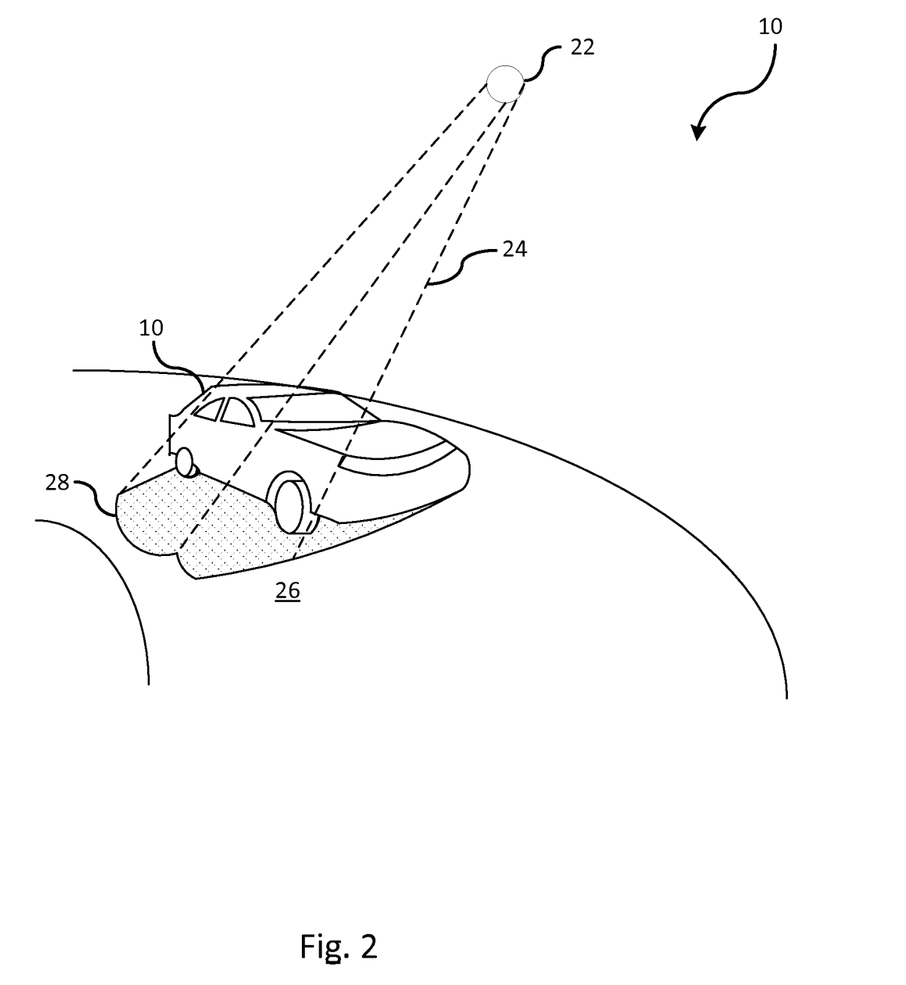
FIG. 2 is a pictorial illustration of the vehicle casting a shadow.

FIG. 2 illustrates pictorial illustration of the vehicle casting a shadow. A vehicle 10 is shown in a road of travel. For the purposes described herein, the vehicle 10 is assumed to be stationary. A known illumination light source, such as the sun, is shown generally at 22. The known illumination light source 22 projects illumination rays 24 at the ground 26. For casting a shaded area 28 on the ground 26. When the image scene is captured by a vision-based imaging system, the detection software for the vision-based imaging system may have trouble distinguishing the vehicle 10 from the shaded area 28. As a result, various techniques and systems as described herein may be used in cooperation with the vision-based imaging system for eliminating or reducing the shadow in the captured images.

Figure 3:
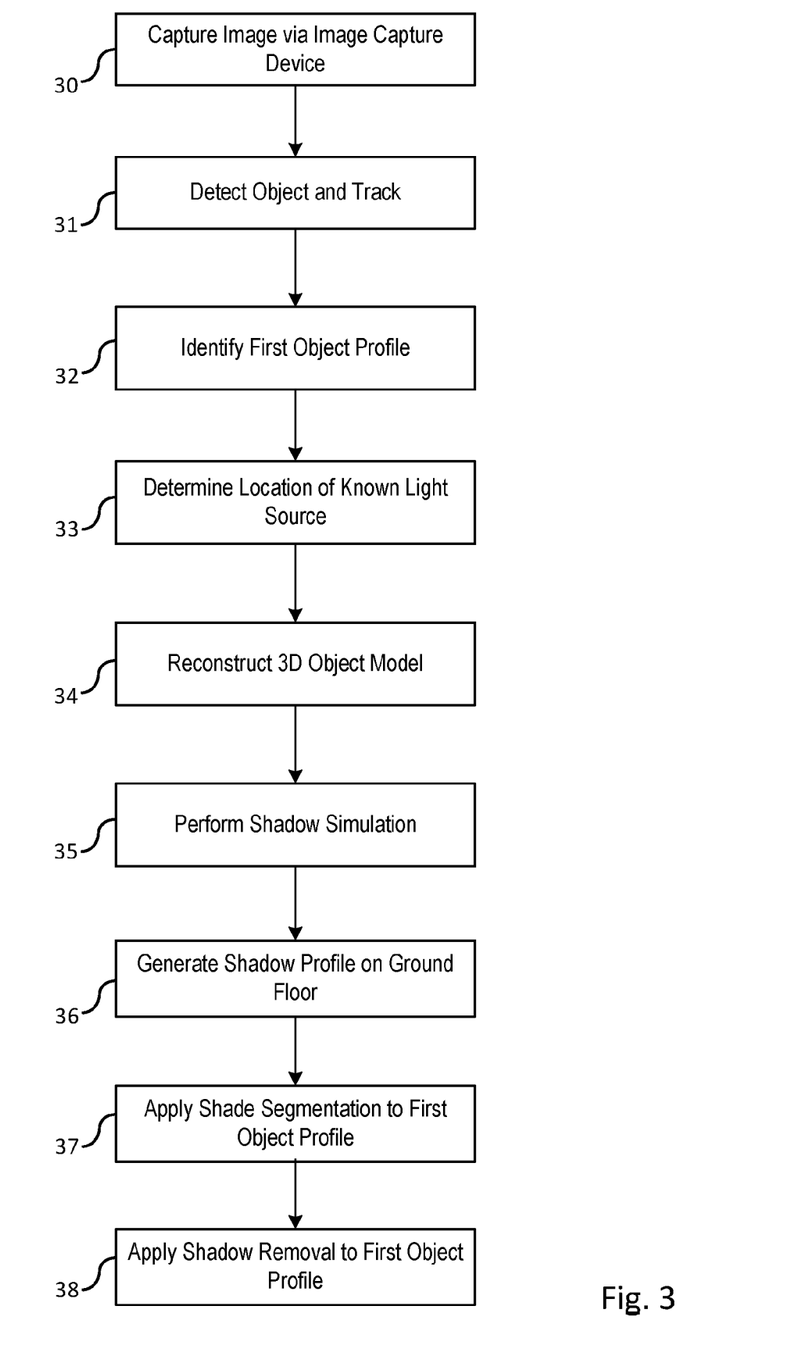
FIG. 3 is a block diagram for a process of reducing shadows cast by a vehicle from a known light source.

FIG. 3 illustrates a block diagram for reducing shadows cast by a vehicle from a known light source. In block 30, an image is captured by the vision-based imaging system. In block 31, an object is detected and continuously tracked by an object detection sensor, such as a range sensor. Preferably, the tracking data is three-dimensional (3-D) data. Sensor registration may also be performed. Sensor registration is a process of transforming different sets of data under one coordinate system. Registration is necessary in order to be able to integrate and compare data obtained from different sensors.

In block 32, a first object profile of the object is identified from the captured image by projecting the 3D findings onto an image domain. Other factors that are known or assumed to be known are the calibration between the vision-based imaging system, the range sensor, and the vehicle.

In block 33, a location of a known illumination source, such as the sun, is determined. Approximate geospatial location of the sun may be determined based on the date and time of day. Given the date and the time of the day, a location of sun within the sky can be readily determined. As a result, the location of the sun relative to the object can be analyzed.

In block 34, reconstruction of a three-dimensional object model is performed. A partial three-dimensional object surface is complemented by using a box model or some other type of symmetry assumption that outlines the object. In this example, the box model is that of a vehicle. A vehicle orientation is determined based on searching and matching partial L-shape sensed data from the captured images. That is, when a vehicle is viewed from an angle, reflection points from the range sensor data will take on an L-shape. The vehicle outlines are defined by projecting the detected vehicle's three-dimensional contour onto the image plane, which is referred to as the second object profile.

In block 35, shadow simulation is performed on the image by projecting light rays from the estimated location of the known light source (e.g., sun) toward the second object profile. In addition, a road location with respect to the object is known.

In block 36, a shadow profile is generated on the ground floor in the image plane as a result of the second object profile blocking the projected light rays transmitted by the sun.

In block 37, shade segmentation is applied to the first object profile. That is, the first object profile is segmented in those respective areas that correspond to the area where the shadow profile overlays on the first object profile. The overlapping area in the first object profile represents the area that has been identified as a shaded area where shadow removal can be applied.

In block 38, the shadow removal is performed on the first object profile as a function of the shade segmentation. Those areas segmented that represent shaded areas from the first object profile are illuminated to match the illumination of the ground surface for removing or reducing the effects of the cast shadow in the captured image. Therefore, various vehicle applications, such as a clear path detection system, can distinguish the vehicle in the captured image from the shadows. The elimination or reduction of shadows in the captured image will improve the possibility of the clear path detection system, or other systems utilizing this data misinterpreting the shadow as part of the vehicle.

Figure 4:
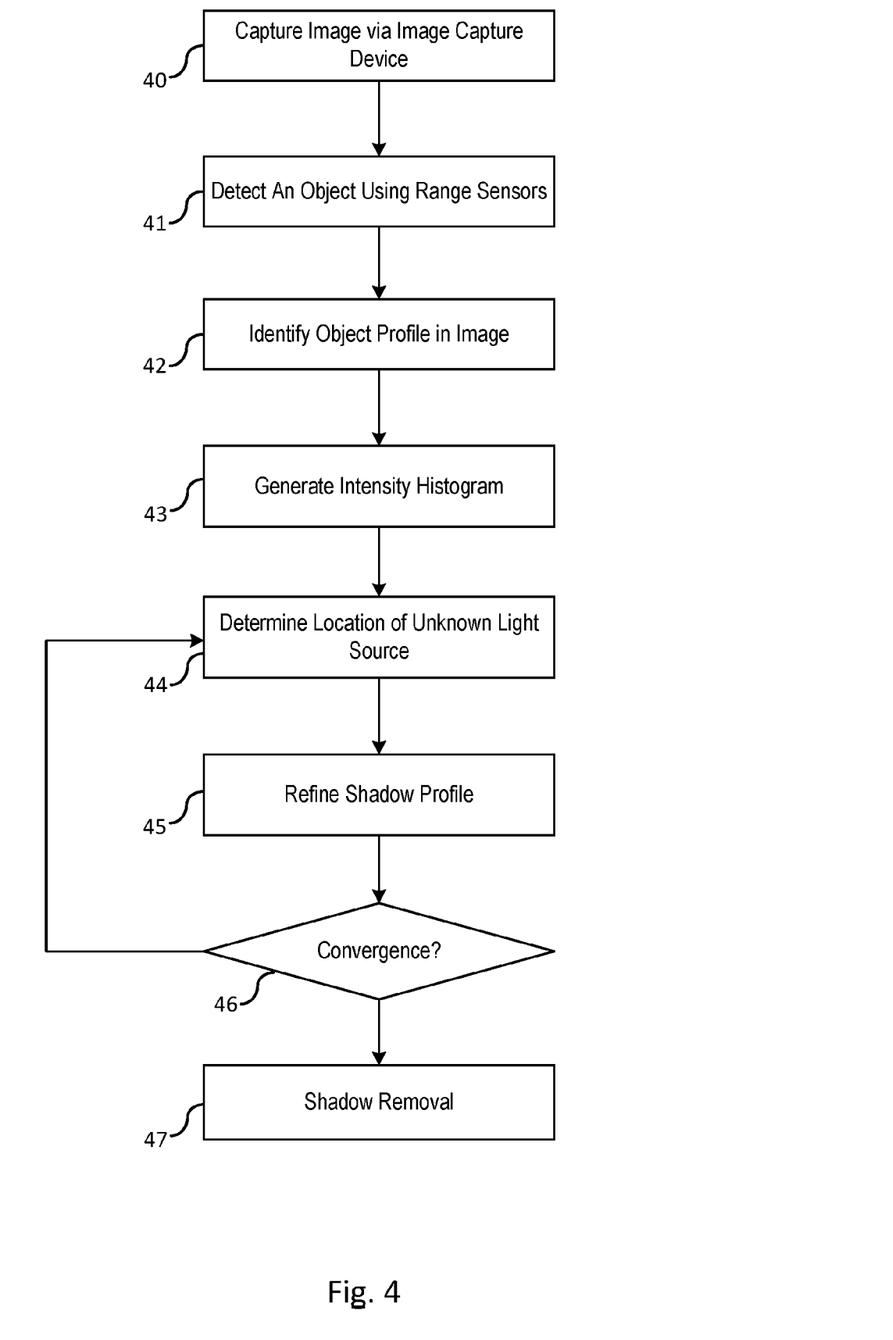
FIG. 4 is a block diagram for a process of reducing shadows cast by a vehicle from an unknown light source

FIG. 4 illustrates a block diagram for reducing shadows cast by a vehicle from an unknown light source.

In block 40, an image is captured by the vision-based imaging system. In block 41, an object is detected by a range sensor device.

In block 42, a first object profile of an object is identified in the captured image.

Figure 5A:
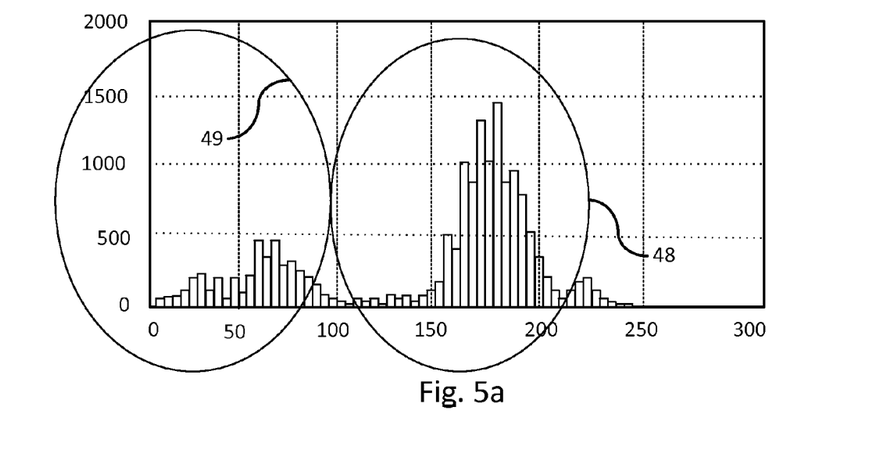
FIGS. 5a-c are exemplary RGB intensity histograms for respective captured image.
Figure 5B:
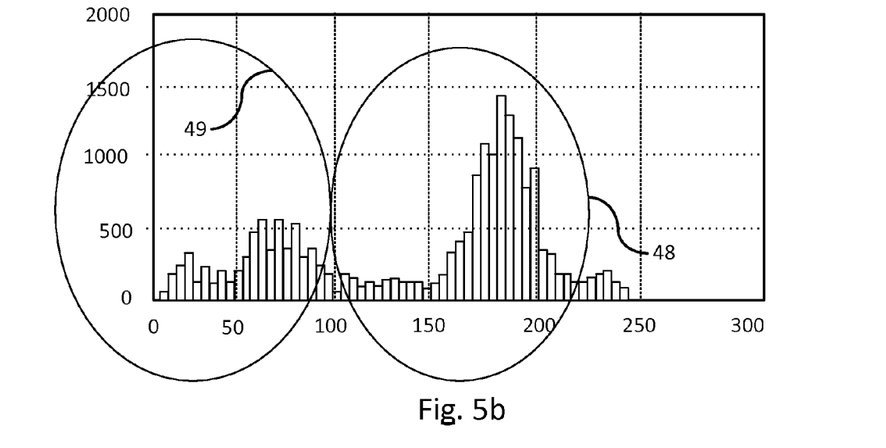
Figure 5C:
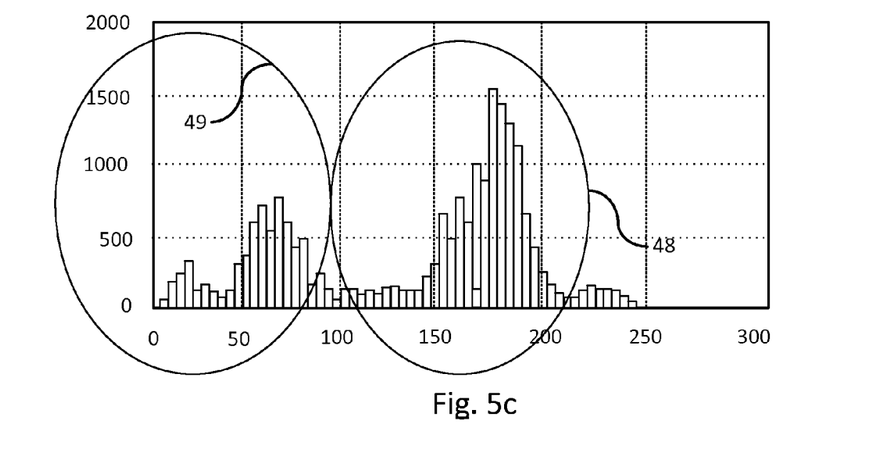

In block 43, an intensity histogram is generated for the area surrounding the detected object in the captured image. The intensity histogram identifies the color intensities of the image per color channels. An example of intensity histograms are the RGB histograms shown in FIGS. 5a, 5b, 5c (color space is not constrained to RGB only). Each of the FIGS. 5a-c illustrate an intensity histogram for the color red, green, and blue (RGB). The x-axis of each histogram represents an intensity level of the respective color and the y-axis represents the number of pixels for a respective intensity level. Pixels representing non-shaded areas (e.g., lighter areas) of the image are generally represented by 48. Pixels representing shaded areas (e.g., darker areas) of the image are generally represented by 49.

A shadow is usually represented by a grayish or non-colored intensity level (the shadowed area appears darker than the non-shaded area). To determine whether a shadow is present, the histograms of ground area surrounding the vehicle is analyzed and split into regions corresponding to shade and non-shade area.

Figure 6A:
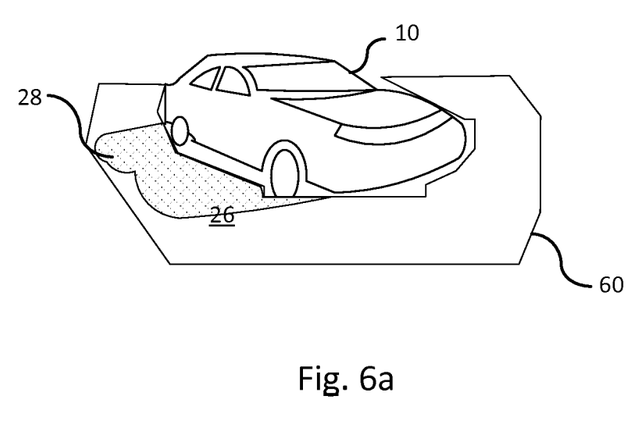
FIG. 6a is a pictorial illustration of a ground and vehicle segmentation.
Figure 6B:
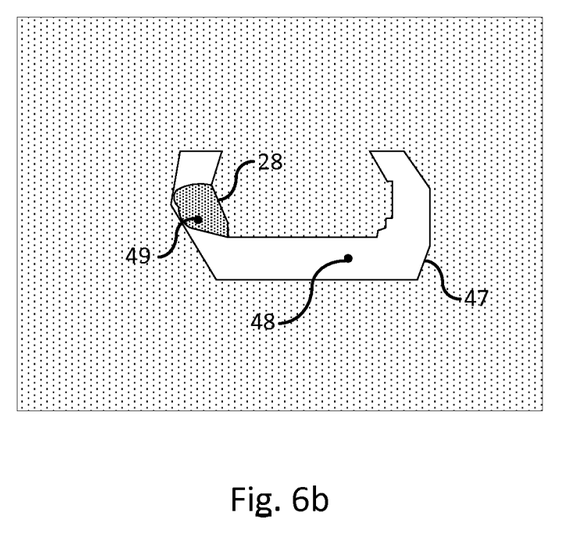
FIG. 6b is a pictorial illustration ground shade versus ground non-shade analysis.

FIGS. 6a-b illustrates a pictorial of shade segmentation where just the ground area surrounding the vehicle is analyzed for determining whether a respective pixel is shade or non-shade. In FIG. 6a, the ground 26 surrounding the vehicle 10 is segmented from the vehicle as represented generally by 60. Once an area is identified and segmented from the vehicle, an intensity analysis is performed on the segmented area 60 for determining where shade is present.

In FIG. 6b, a pixel 48 represented by x-coordinate 193 and y-coordinate 297 is analyzed. The pixel 48 is a non-shaded pixel and has an RGB intensity of 175, 170 and 167. An example of a shaded pixel is represented by x-coordinate 50 and y-coordinate 186 is shown generally at 49. Pixel 49 has an RGB intensity of 56, 64, and 83 respectively (e.g., appears darker). The low intensity values are indicative of shade. As a result, an initial shadow profile that represents the shadow cast by a combination of the vehicle and the unknown illumination (e.g., artificial lighting) may be determined. Each of the pixels in the segmented area can be analyzed and compared with neighboring pixels for determining likeness and similarity with respect to color intensity. As a result, shaded areas appear darker and will be designated with a color intensity resembling a gray color.

Referring again to FIG. 4, in block 44, based on initial shadow profile and the second object profile as detected by the object detection sensors, a direction and spatial location of the unknown illumination source may be determined. By identifying a contour of the initial shadow profile and projecting light rays in a reverse direction, the general location and direction of the unknown light source may be determined.

In block 45, a shadow profile is refined by iteratively performing blocks 30-38 described in FIG. 3.

In block 46, a determination is made whether the first object profile and the refined shadow profile converges. If convergence is not present then the routine proceeds back to step 44; otherwise the routine proceed to step 47. Typically, 2 or 3 iterations are required for convergence to take place.

In step 47, the shadow removal is performed of the first object profile as a function of the shade segmentation. Those areas segmented that represent shaded areas from the first object profile are illuminated to match the illuminated ground surface for removing or reducing the effects of the cast shadow in the captured image.

It should be understood that if the vehicle casting the shadow is moving, then the direction of the light source may be determined using a previous determination of a previous captured image frame.

Figure 7:
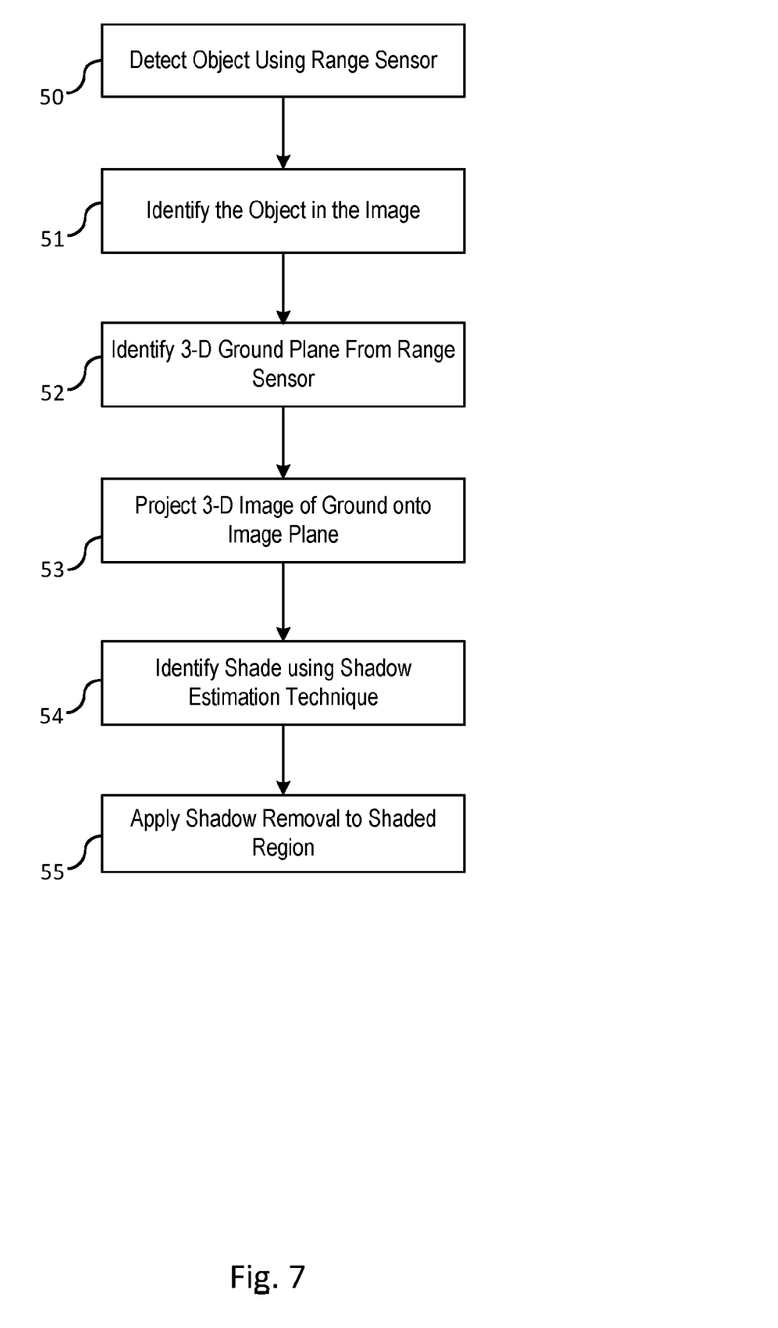
FIG. 7 is a block diagram of a process for reducing shadows on an unidentified object.

FIG. 7 illustrates a block diagram for reducing shadows on an unidentified object.

In block 50, the object detection sensor, such as the range sensor, is used to detect the object. The detected object is identified using a 3D-segmentation technique mapped into an image domain and accurately refined. The 3-D segmentation technique may include, but is not limited to, graph cuts, active contour/partial differential equations, or dynamic video segmentation.

Graph cuts segmentation algorithms with seeding points mapped from the range sensor domain are applied to the image. Usage of seeding points is proved to lead to better and faster segmentation.

Active contour/partial differential equations include identifying active contours using approximate boundaries as an initial condition or a regularization condition.

Dynamic video segmentation involves three-dimensional coordinates of range sensor points near the image contour boundary that are used to identify a model shape of the object.

In block 51, an object is identified in the image.

In block 52, a three-dimensional image of the ground is identified from the range sensor data.

In block 53, a three-dimensional image of the ground is projected onto the image plane of the captured image.

In block 54, the shade in the image plane surrounding the object is identified utilizing a shadow estimation technique. It should be understood that various shadow estimation techniques may be used that include, but are limited to, utilizing an intensity histogram as described earlier, applying a texture-based technique, a geometry-based technique, and a temporal-based approach.

The texture-based technique distinguishes a texture of the shadow from a texture of the object. The geometry-based technique utilizes known models in comparison to parameters estimated from the captured image. The temporal-based approach utilizes temporal characteristics to distinguish between time-elapsed images.

In block 55, shadow removal is applied to the identified shaded region.

While certain embodiments of the present invention have been described in detail, those familiar with the art to which this invention relates will recognize various alternative designs and embodiments for practicing the invention as defined by the following claims.

What is claimed is:

1. A method for creating a shadow-reduced image from a captured image, the method comprising the steps of:

capturing an image of a scene exterior of a vehicle by a vehicle-based image capture device;

identifying a first object profile of an object in the captured image by a processor;

detecting a second object profile of the object using a non-vision object detection device; and removing shadows in the captured image, by the processor, as a function of the first object profile and the second object profile includes;

(a) generating an intensity histogram of the captured image;

(b) identifying an initial shadow profile of the first object profile based on the intensity histogram;

(c) estimating a direction of a light source based on a comparison of the initial shadow profile and the second object profile;

(d) simulating light rays projected from the known light source toward the second object profile;

(e) determining a regenerated shadow profile cast on a ground floor based on the projected light rays being blocked by the second object profile;

(f) comparing the regenerated shadow profile with the first object profile;

(g) applying shade segmentation to the first object profile by comparing the regenerated shadow profile with the first object profile; and (h) performing shadow removal on the first object profile as a function of the shade segmentation; and utilizing a shadow reduced image in a vehicle-based application.

2. The method of claim 1 wherein steps (a)-(h) are iteratively performed until the first object profile and the regenerated shadow profile converges.

3. The method of claim 1 wherein estimating the direction of the light source when the vehicle is moving utilizes a previous determination of a location of the light source identified in a previous captured image frame.

4. The method of claim 1 wherein identifying an initial shadow profile of the first object profile based on the intensity histogram includes identifying modes of the intensity histogram corresponding to non-colored regions.

5. The method of claim 1 wherein detecting the first object profile and the second object profile includes determining each object profile utilizing a three-dimensional contour.

* * * * *